(12) United States Patent
Nakamura et al.

(10) Patent No.: US 11,130,585 B2
(45) Date of Patent: Sep. 28, 2021

(54) AERIAL VEHICLE

(71) Applicant: NIPPON KAYAKU KABUSHIKI KAISHA, Chiyoda-ku (JP)

(72) Inventors: Hiroshi Nakamura, Himeji (JP); Yasuhiko Yagihashi, Himeji (JP); Koichi Sasamoto, Himeji (JP)

(73) Assignee: NIPPON KAYAKU KABUSHIKI KAISHA, Chiyoda-ku (JP)

( * ) Notice: Subject to any disclaimer, the term of this patent is extended or adjusted under 35 U.S.C. 154(b) by 8 days.

(21) Appl. No.: 16/642,765

(22) PCT Filed: Jun. 19, 2018

(86) PCT No.: PCT/JP2018/023363
§ 371 (c)(1),
(2) Date: Feb. 27, 2020

(87) PCT Pub. No.: WO2019/044125
PCT Pub. Date: Mar. 7, 2019

(65) Prior Publication Data
US 2020/0198791 A1 Jun. 25, 2020

(30) Foreign Application Priority Data
Aug. 30, 2017 (JP) .............................. JP2017-165643

(51) Int. Cl.
*B64D 17/80* (2006.01)
*B64C 31/036* (2006.01)

(52) U.S. Cl.
CPC ............ *B64D 17/80* (2013.01); *B64C 31/036* (2013.01)

(58) Field of Classification Search
CPC ........ B64D 17/80; B64D 17/56; B64D 31/06; B64C 31/036
See application file for complete search history.

(56) References Cited

U.S. PATENT DOCUMENTS 5,044,576 A * 9/1991 Inada .................... B64C 31/036
244/13
6,338,457 B1 * 1/2002 Hilliard .................. B64D 17/80
244/137.4

(Continued)

FOREIGN PATENT DOCUMENTS

EP    1 155 928 A1    11/2001
JP    11-59595 A    3/1999
JP    2012-1088 A    1/2012

OTHER PUBLICATIONS

International Search Report dated Aug. 7, 2018 in PCT/JP2018/023363 filed Jun. 19, 2018, 1 page.

(Continued)

*Primary Examiner* — Rodney A Bonnette
(74) *Attorney, Agent, or Firm* — Oblon, McClelland, Maier & Neustadt, L.L.P.

(57) ABSTRACT

An aerial vehicle includes an airframe, a canopy capable of adjusting a speed of falling during falling, a brake cord having one end connected to the canopy, a wind-up apparatus provided in the airframe and being capable of winding up the other end of the brake cord, a sensor unit that detects a distance to an external object, and a controller that controls an operation of the wind-up apparatus based on a result of detection by the sensor unit. The wind-up apparatus includes a gas generator as a drive source. The controller has the wind-up apparatus operate to wind up the other end of the brake cord by activating the gas generator when the distance detected by the sensor unit is equal to or smaller than a prescribed value.

6 Claims, 6 Drawing Sheets

(56) References Cited

U.S. PATENT DOCUMENTS

| | | | |
|---|---|---|---|
| 6,682,017 B1* | 1/2004 | Giannakopoulos | B64D 25/12 244/140 |
| 6,824,098 B1 | 11/2004 | Belloso | |
| 2003/0025038 A1 | 2/2003 | Nicolai et al. | |
| 2007/0145193 A1 | 6/2007 | Hakki et al. | |
| 2009/0045284 A1 | 2/2009 | Chu | |
| 2009/0173829 A1 | 7/2009 | Hakki et al. | |
| 2010/0181408 A1 | 7/2010 | Suhr et al. | |
| 2020/0115046 A1* | 4/2020 | Yoeli | B64C 39/024 |
| 2020/0198790 A1* | 6/2020 | Yagihashi | B64C 39/024 |
| 2020/0216181 A1* | 7/2020 | Yagihashi | B64C 39/00 |
| 2020/0339278 A1* | 10/2020 | Nakamura | B64D 17/72 |

OTHER PUBLICATIONS

The extended European search report dated Apr. 12, 2021 in corresponding European Patent Application No. 18849619.4 (5 pages).

* cited by examiner

AERIAL VEHICLE

TECHNICAL FIELD

The present invention relates to an aerial vehicle represented, for example, by a drone and particularly to an aerial vehicle including a paraglider capable of adjusting a speed of falling thereof during falling.

BACKGROUND ART

Various aerial vehicles have conventionally been known. The aerial vehicle includes not only a manned aircraft such as a passenger aircraft or a helicopter but also an unmanned aircraft. In particular, with recent development of an autonomous control technology and a flight control technology, industrial applications of an unmanned aircraft such as a drone have increasingly been expanded.

A drone includes, for example, a plurality of rotors, and flies by rotating the plurality of rotors simultaneously in a balanced manner. At that time, ascent and descent are done by uniformly increasing or decreasing the number of rotations of the plurality of rotors, and movement forward and rearward is done by inclining an airframe by individually increasing or decreasing the number of rotations of each of the plurality of rotors. It is expected that such an unmanned aircraft will more increasingly be used worldwide in the future.

A falling accident of an unmanned aircraft, however, has been feared, which has interfered widespread use of the unmanned aircraft. In order to lower the possibility of such a falling accident, a parachute apparatus for an unmanned aircraft that serves as a safety apparatus has been put into practical use. Such a parachute apparatus for an unmanned aircraft lessens impact at the time of landing by lowering a speed of the unmanned aircraft by using an expanded parachute in the event of falling of the unmanned aircraft.

An unmanned motor paraplane capable of flying by gaining lift by an expanded canopy (a part of a paraglider that forms a wing shape) during normal flight has been known. For example, Japanese Patent Laying-Open No. 11-59595 (PTL 1) discloses an unmanned motor paraplane including a propulsive unit that rotates a propeller, a paraglider including the canopy described above, and a toggle with which an airframe is controlled to make descent, the unmanned motor paraplane realizing safe unmanned flight by allowing remote control of the propulsive unit and the toggle from the ground or over the sea.

The unmanned motor paraplane disclosed in PTL 1 is configured to safely land by a retraction operation by a motor serving as a drive source of the toggle to pull a pair of left and right brake cords (control lines) connected to the canopy and to thereby lower a speed of descent.

CITATION LIST

Patent Literature

PTL 1: Japanese Patent Laying-Open No. 11-59595

SUMMARY OF INVENTION

Technical Problem

When a speed of an aerial vehicle should immediately be lowered in the event of emergency such as occurrence of some trouble in the flying airframe or occurrence of interference, the toggle as disclosed in PTL 1 is not necessarily sufficiently responsive because the motor is employed as the drive source. Therefore, a more responsive actuator has been demanded as a drive source for a retraction mechanism that retracts the brake cord. In particular, a large industrial aerial vehicle is greater in size and weight of its paraglider with increase in size of the airframe. Therefore, a brake cord retraction mechanism including an actuator which is not only responsive but also strong is required.

In the event of emergency described above, it may be difficult for an operator to control a direction of the aerial vehicle. In such a case, a flying speed of the aerial vehicle is desirably automatically lowered immediately before landing or immediately before contact with an obstacle.

The present invention was made in view of such circumstances, and an object thereof is to provide an aerial vehicle capable of automatically and instantaneously retracting a brake cord of a paraglider expanded in advance and thus sufficiently lowering a speed thereof immediately before landing or immediately before contact with an obstacle.

Solution to Problem

An aerial vehicle based on the present invention includes an airframe, a propulsive mechanism, a canopy, a brake cord, a wind-up apparatus, a sensor unit, and a controller. The propulsive mechanism propels the airframe and is provided in the airframe. The canopy forms a wing shape by receiving wind and is capable of adjusting a speed of falling during falling. The brake cord has one end connected to the canopy. The wind-up apparatus is provided in the airframe and capable of winding up the other end of the brake cord. The sensor unit detects a distance to an external object. The controller controls an operation of the wind-up apparatus based on a result of detection by the sensor unit. The wind-up apparatus includes a gas generator as a drive source. When the distance detected by the sensor unit is equal to or smaller than a prescribed value, the controller has the wind-up apparatus operate to wind up the other end of the brake cord by activating the gas generator.

The canopy and the brake cord described above are members that generally make up a paraglider. The member including the canopy and the brake cord, however, is not limited to the paraglider so long as it is able to lower a speed of the aerial vehicle as a result of generation of lift or buoyance in an expanded state. A paraglider is in a shape like a wing having an aspect ratio approximately not lower than one, and it is connected to an aerial vehicle through a coupling member (which is generally referred to as a cord or a line). The coupling member includes a steering cord called the above-described brake cord connected to left and right ends of the wing. By pulling the brake cord, various stresses applied to a cross-section of the wing can be varied and consequently, gliding, turning, and rapid deceleration can be done. Therefore, the paraglider can do gliding, turning, and rapid deceleration which cannot be done by a parachute. A Rogallo paraglider and a triangular paraglider are also available as similarly constructed paragliders. In order to maintain the shape of the wing by using ram air, a paraglider with an air intake (an air inlet which will be described later) is in the mainstream, however, there is a paraglider without an air intake. In order to fly in a stable manner, a paraglider with an air intake is more preferably used. From a point of view of reduction in weight, a single surface paraglider (that is, a paraglider without an air intake) is preferably used. Furthermore, a paraglider of a type capable of flying by forcibly obtaining propelling force by separately providing a propulsive apparatus such as a propeller may be used.

In the aerial vehicle based on the present invention, the wind-up apparatus may include a wind-up shaft around which the brake cord is wound up by being rotated in a direction of wind-up, a rotary member capable of rotating the wind-up shaft in the direction of wind-up by being rotated in a prescribed direction, and a movable member movable toward the rotary member. In that case, preferably, the rotary member is provided with a plurality of first teeth and the movable member is provided with a plurality of second teeth that can be meshed with the plurality of first teeth. In this case, preferably, as the movable member is moved toward the rotary member by receiving a pressure of gas generated by the gas generator, the plurality of second teeth are meshed with the plurality of first teeth and the rotary member is thus rotated in the prescribed direction.

In the aerial vehicle based on the present invention, the wind-up apparatus may include a wind-up shaft around which the brake cord is wound up by being rotated in a direction of wind-up, a rotary member capable of rotating the wind-up shaft in the direction of wind-up by being rotated in a prescribed direction, a ring-shaped member movable toward the rotary member, the ring-shaped member being capable of rotating the rotary member in the prescribed direction by being rotated in the prescribed direction, and a motive power transmitter that transmits motive power to the ring-shaped member. The motive power transmitter may include a pipe-shaped member, a motive power transmission element movably accommodated in the pipe-shaped member, and a piston capable of pressing the motive power transmission element. In that case, preferably, the rotary member is provided with a plurality of first teeth, and the ring-shaped member is provided with a plurality of second teeth that can be meshed with the plurality of first teeth and a plurality of third teeth that can be engaged with the motive power transmission element. In this case, preferably, with movement of the ring-shaped member toward the rotary member by receiving motive power transmitted by the motive power transmission element moved by being pressed by the piston that receives a pressure of gas generated by the gas generator, the motive power transmission element is engaged with the plurality of third teeth and the plurality of second teeth are meshed with the plurality of first teeth, and then the rotary member is rotated in the prescribed direction.

In the aerial vehicle based on the present invention, preferably, the gas generator generates gas with burning of gunpowders or a propellant.

The aerial vehicle based on the present invention may include a manipulation mechanism provided in the airframe, with which the brake cord is manipulated. In that case, the manipulation mechanism can wind up and unwind the other end of the brake cord and may include a driver as a drive source. In this case, the wind-up apparatus is contained in the manipulation mechanism. In that case, preferably, the controller controls an operation of the manipulation mechanism based on a result of detection by the sensor unit. Preferably, when the distance detected by the sensor unit is larger than the prescribed value, the controller controls the operation of the manipulation mechanism by controlling the driver.

In the aerial vehicle based on the present invention, the sensor unit preferably includes at least one of an acceleration sensor, a gyro sensor, a barometric pressure sensor, a GNSS apparatus, a laser sensor, an ultrasonic sensor, an infrared sensor, millimeter-wave radar, sub millimeter-wave radar, a speed sensor, and a wind direction sensor.

Advantageous Effects of Invention

According to the present invention, an aerial vehicle capable of automatically and instantaneously retracting a brake cord of a paraglider expanded in advance and thus sufficiently lowering a speed thereof immediately before landing or immediately before contact with an obstacle can be obtained.

DESCRIPTION OF EMBODIMENTS

An embodiment of the present invention will be described in detail below with reference to the drawings. The embodiment shown below illustrates application of the present invention to a drone representing an unmanned aircraft as an aerial vehicle.

Figure 1:
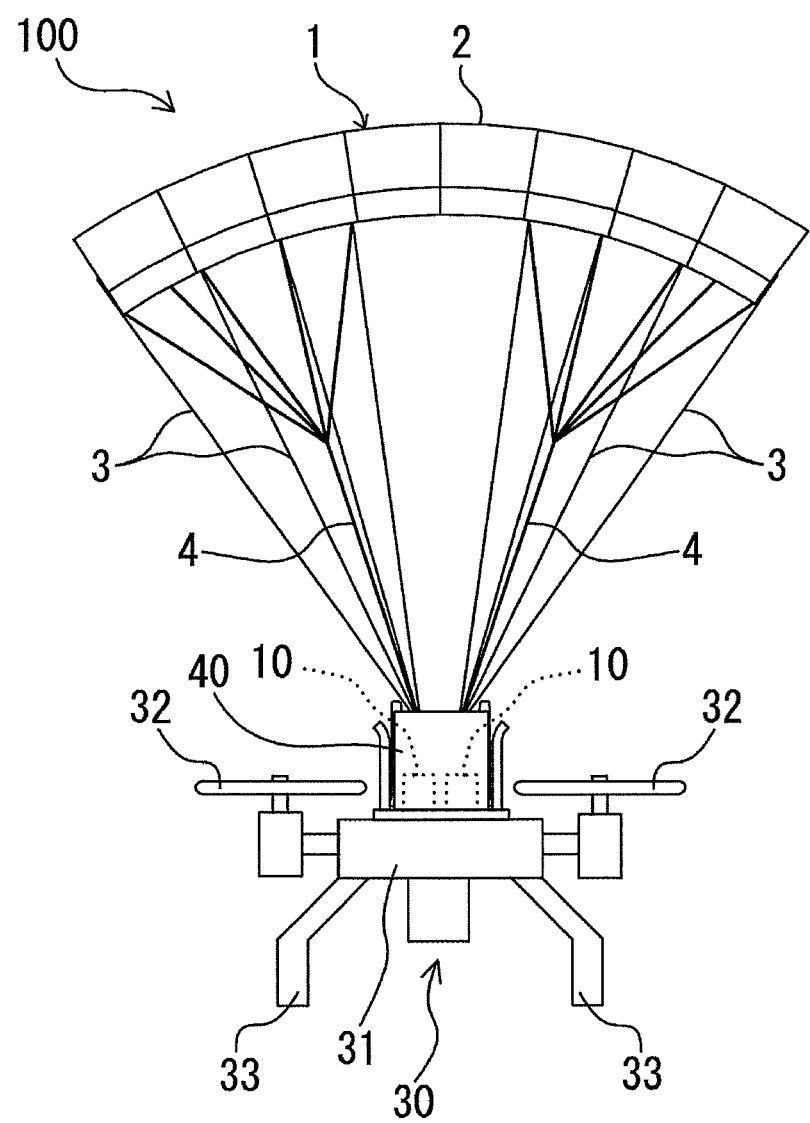
FIG. 1 is a schematic front view showing a state after expansion of a paraglider of an aerial vehicle according to an embodiment.

FIG. 1 is a schematic front view showing a state after expansion of a paraglider of an aerial vehicle according to an embodiment. As shown in FIG. 1, an aerial vehicle 30 includes an airframe 31, at least one propulsive mechanism (for example, a propeller) 32 that is provided in airframe 31 and propels airframe 31, a plurality of legs 33 provided under airframe 31, and a paraglider apparatus 100 as a safety apparatus provided in airframe 31. Paraglider apparatus 100 mainly includes a paraglider 1 and a manipulation mechanism 10 and paraglider 1 mainly includes a canopy 2 and a brake cord 4.

Figure 2:
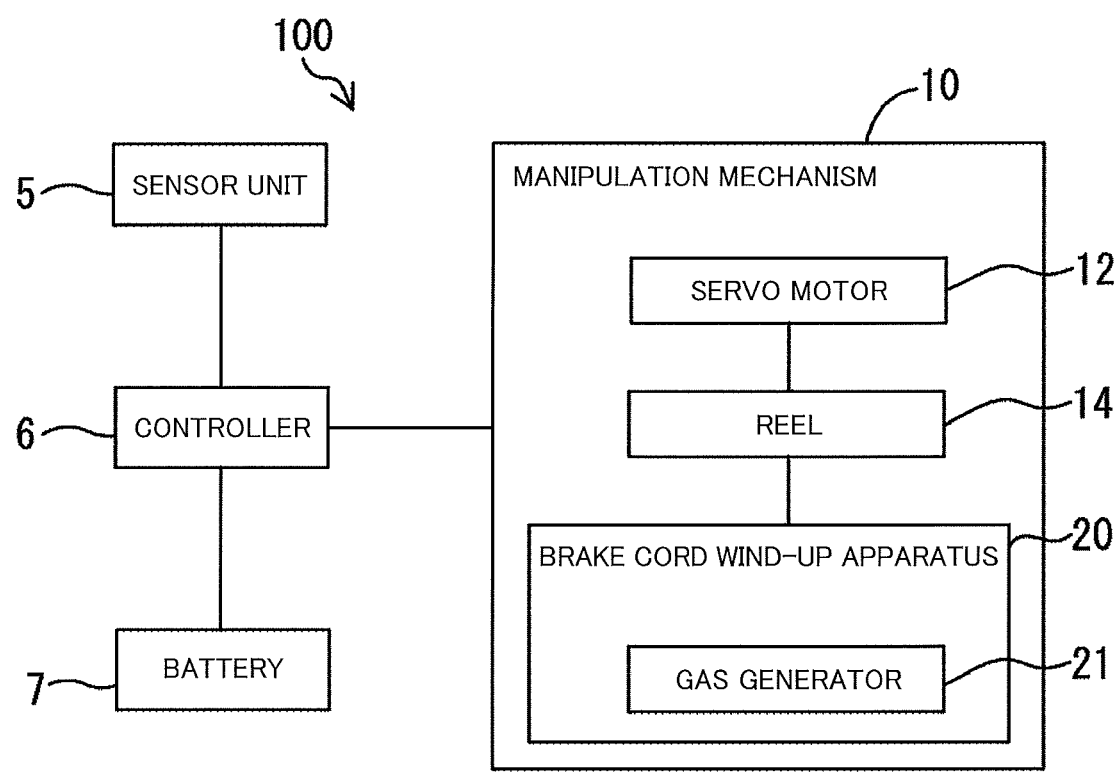
FIG. 2 is a diagram showing a configuration of a functional block of the aerial vehicle according to the embodiment.

FIG. 2 is a diagram showing a configuration of a functional block of the aerial vehicle according to the present embodiment. As shown in FIG. 2, paraglider apparatus 100 includes a sensor unit 5, a controller 6, and a battery 7 in addition to paraglider 1 and manipulation mechanism 10 described above, and can be mounted on aerial vehicle 30. Sensor unit 5, controller 6, and battery 7 may be integrated with paraglider apparatus 100 or provided in airframe 31 separately from a main body of paraglider apparatus 100.

In a normal condition (before expansion of paraglider 1), canopy 2 and brake cord 4 of paraglider 1 are stored as being folded in a cylindrical portion 40 (see FIG. 1) provided in airframe 31, and it is set to an expanded state shown in FIG. 1 by being expanded after it is ejected out of cylindrical portion 40 by activation of an ejector (not shown) that has received an abnormality signal output from a control mechanism (not shown) of aerial vehicle 30 in the event of emergency.

Referring to FIG. 1, paraglider 1 includes canopy 2 that forms a wing shape as a whole by receiving air, a plurality of suspension lines 3 extending downward from canopy 2 and coupled to aerial vehicle 30, and a pair of left and right brake cords 4 described above.

In the expanded state, canopy 2 is in a shape extending laterally substantially like an arc above aerial vehicle 30 when paraglider 1 is viewed from front. Suspension lines 3 extend from canopy 2 to aerial vehicle 30 in symmetry, with four suspension lines located on the left and four suspension lines located on the right.

The pair of left and right brake cords 4 serve for control of aerial vehicle 30. Each of the pair of left and right brake cords 4 has one end connected to canopy 2 and the other end connected to a reel 14 (see FIGS. 2 and 3) in a pair of left and right manipulation mechanisms 10 which will be described later. More specifically, each of the pair of left and right brake cords 4 has one end branched in midway into four branches in symmetry. Each of tip ends of the branches is connected to a rear edge of canopy 2 and a tip end of the other end that is not branched is connected to reel 14 in manipulation mechanism 10. One end of each of the pair of left and right brake cords 4 does not necessarily have to be branched but may be connected directly to canopy 2 without being branched.

Aerial vehicle 30 having paraglider 1 expanded in the event of emergency is configured to change the shape of canopy 2 by manipulating the pair of left and right brake cords 4 to thereby change resistance against a received wind pressure and to control turning, ascent, or descent. For example, when aerial vehicle 30 is to turn right, right brake cord 4 is pulled to increase resistance on a right side of canopy 2 so that a speed on a right side portion of canopy 2 is lowered to change direction. When aerial vehicle 30 is to land, the pair of left and right brake cords 4 is pulled to increase resistance of the entire canopy 2 so that a speed of descent is lowered and the aerial vehicle can land. Manipulation to pull brake cord 4 refers to manipulation for wind-up of brake cord 4 by reel 14 in manipulation mechanism 10.

Figure 3:
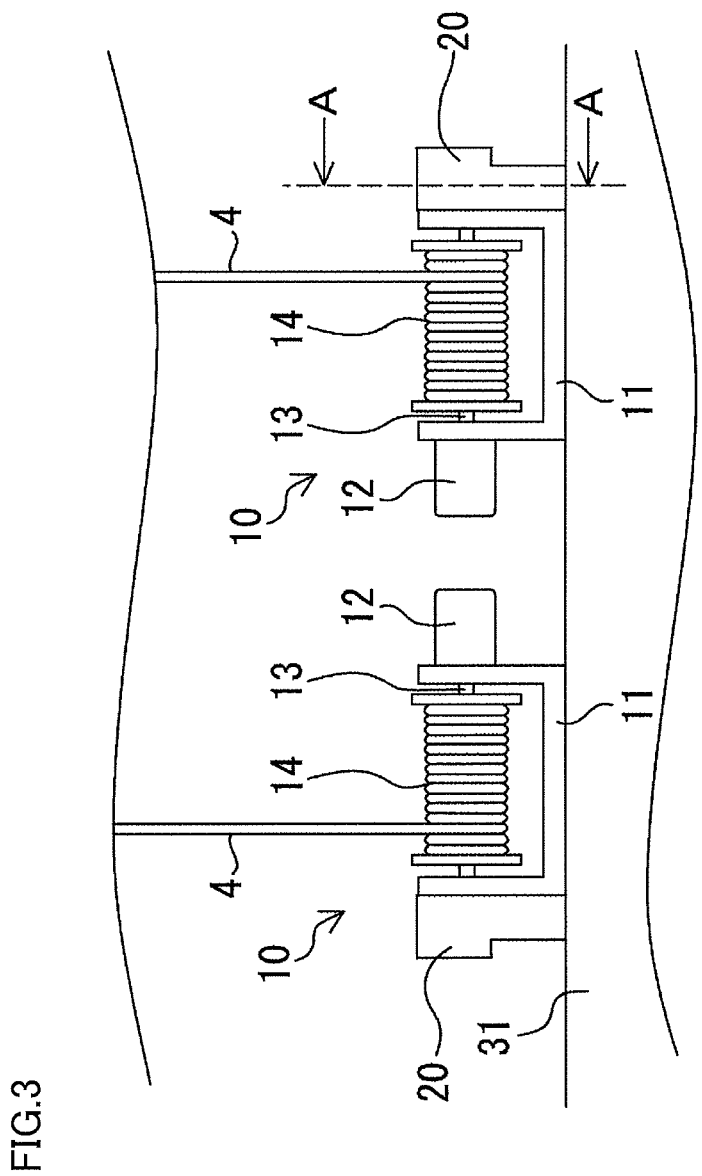
FIG. 3 is a schematic diagram showing a pair of left and right manipulation mechanisms of the paraglider shown in FIG. 1.

FIG. 3 is a schematic diagram showing the pair of left and right manipulation mechanisms of the paraglider shown in FIG. 1. As shown in FIG. 3, each of the pair of left and right manipulation mechanisms 10 includes a support base 11, a servo motor 12 as a driver, a reel shaft 13, reel 14, and a brake cord wind-up apparatus 20 as a wind-up apparatus. The pair of left and right manipulation mechanisms 10 is provided in correspondence with the pair of left and right brake cords 4.

Support base 11 is fixed to an upper portion of airframe 31 in cylindrical portion 40 of aerial vehicle 30. Servo motor 12 is fixed to a side portion on one end side of support base 11 and has an output shaft integrated with one end of reel shaft 13. Reel shaft 13 has the other end integrated as being coupled to a wind-up shaft 22 of brake cord wind-up apparatus 20 which will be described later. Reel 14 is supported as being rotatable around reel shaft 13. According to such a construction, each of the pair of left and right manipulation mechanisms 10 can perform manipulation to wind up brake cord 4 around reel 14 and manipulation to unwind brake cord 4 from reel 14 as appropriate by means of servo motor 12.

Figure 4:
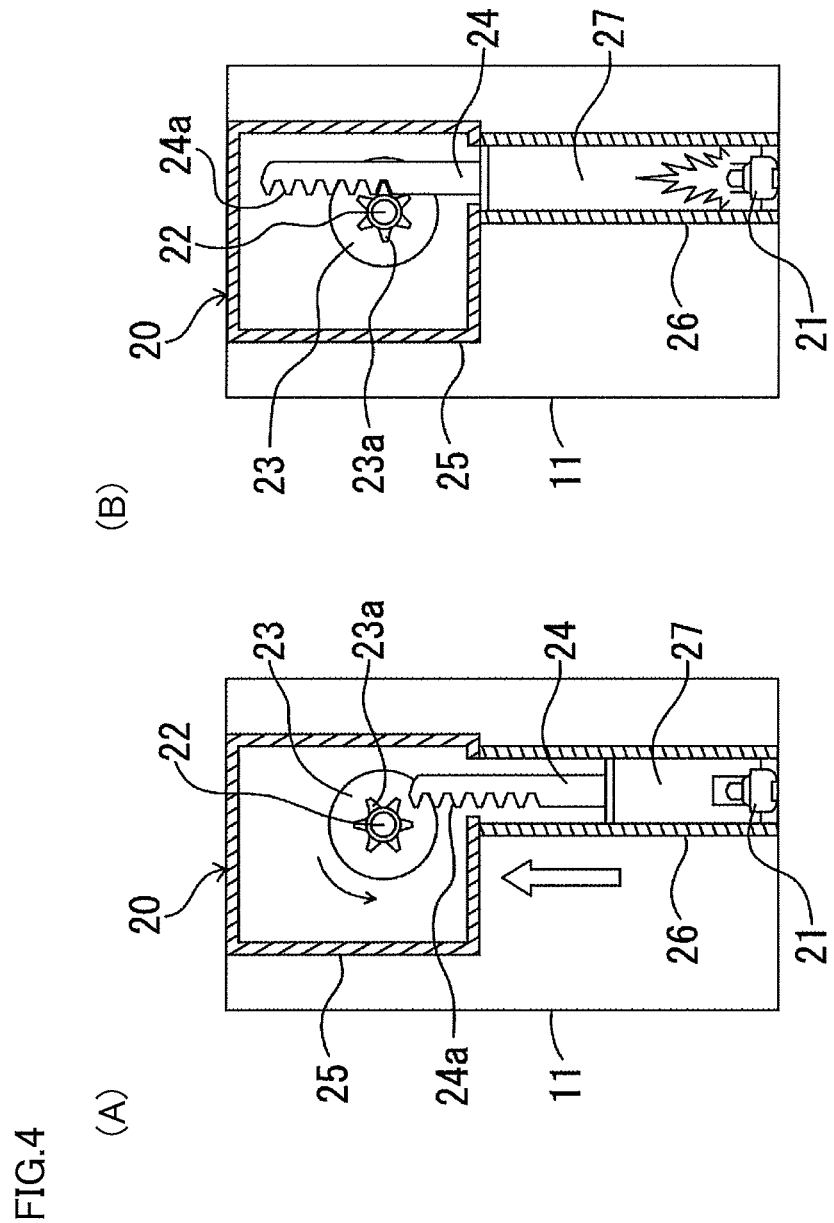
FIG. 4 is a schematic cross-sectional view along the line A-A shown in FIG. 3, with (A) being a diagram showing an initial state of a wind-up apparatus and (B) being a diagram showing a state after an operation of the wind-up apparatus.

FIG. 4 is a schematic cross-sectional view along the line A-A shown in FIG. 3, with (A) being a diagram showing an initial state of the wind-up apparatus and (B) being a diagram showing a state after an operation of the wind-up apparatus. As shown in FIGS. 4(A) and (B), brake cord wind-up apparatus 20 includes wind-up shaft 22 connected to reel 14 with reel shaft 13 being interposed, a rotary member 23 including a plurality of rotary teeth 23a as a plurality of first teeth, a movable member 24 including a plurality of movable teeth 24a as a plurality of second teeth, and a gas generator 21 as a drive source capable of moving movable member 24 along an inner wall of a cylindrical member 26 with a gas pressure generated by activation. Brake cord wind-up apparatus 20 is provided in a side portion on the other end side of support base 11.

Rotary member 23 is provided in a case 25 like a box and fixed to a tip end of wind-up shaft 22. When wind-up shaft 22 is rotated around the axis, the rotary member is rotated in the same direction. When rotary member 23 is rotated in a direction shown with an arcuate arrow shown in FIG. 4(A), wind-up shaft 22 and reel shaft 13 are rotated in the direction of wind-up.

Movable member 24 is slidably inserted in cylindrical member 26 having one end closed and the other end communicating with the inside of case 25. In cylindrical member 26, gas generator 21 is provided at a position opposed to movable member 24, and a space 27 is provided between movable member 24 and gas generator 21. Space 27 is supplied with gas generated by gas generator 21.

As movable member 24 is moved toward rotary member 23 by a gas pressure, the plurality of movable teeth 24a are meshed with the plurality of rotary teeth 23a. Rotary member 23 is thus rotated in the direction shown with the arcuate arrow in FIG. 4(A). Therefore, in brake cord wind-up apparatus 20, wind-up shaft 22 and reel shaft 13 are rotated in the direction of wind-up upon activation of gas generator 21 so that brake cord 4 is wound up around reel 14.

Gas generator 21 is small in size and light in weight, and includes a cup body filled with a gas generating agent, an igniter for igniting the gas generating agent, and a holder that holds the igniter. Though gas generator 21 is implemented, for example, by what is called a micro gas generator (MGG), any component is applicable so long as it can generate gas. The gas generating agent refers to an agent (gunpowders or a propellant) that burns by being ignited by thermal particles produced by activation of the igniter and thus generates gas.

In general, gas generators are broadly categorized into gas generators of a non-explosive type and gas generators of an explosive type. A predominant non-explosive type gas generator is such that a sharp member such as a needle and a compressed spring are coupled to each other in a gas canister in which gas such as carbon dioxide or nitrogen has been sealed and the sharp member is driven off by using spring force of the spring to impinge the sharp member onto a sealing plate that seals the canister and to emit gas. A drive source such as a servo motor is normally used for releasing compressive force of the spring. An explosive type gas generator may be implemented by an igniter alone or by an igniter and a gas generating agent as being combined as described above. A hybrid type or stored type gas generator in which a sealing plate in a small gas canister is cleaved by force generated by gunpowders to emit gas in the inside to the outside may be employed. In this case, incombustible gas such as argon, helium, nitrogen, or carbon dioxide or a mixture thereof can be employed as compressed gas in the gas canister. In order to reliably move movable member 24 at the time of emission of compressed gas, a heat generator composed of a gas generating composition or a thermite composition may be provided in the gas generator. Furthermore, the gas generator may be provided with a filter and/or an orifice that regulates a gas flow rate as necessary.

A non-azide-based gas generating agent is preferably employed as the gas generating agent, and the gas generating agent is formed as a molding generally containing a fuel, an oxidizing agent, and an additive. For the fuel, for example, a triazole derivative, a tetrazole derivative, a guanidine derivative, an azodicarbonamide derivative, a hydrazine derivative, or the like, or combination thereof is made use of. Specifically, for example, nitroguanidine, guanidine nitrate, cyanoguanidine, 5-aminotetrazole, and the like are suitably made use of. As the oxidizing agent, for example, basic nitrate such as basic copper nitrate, perchlorate such as ammonium perchlorate or potassium perchlorate, nitrate containing cations selected from an alkali metal, an alkali earth metal, a transition metal, and ammonia, or the like is made use of. As the nitrate, for example, sodium nitrate, potassium nitrate, or the like is suitably made use of. As the additive, a binder, a slag formation agent, a combustion modifier, or the like is exemplified. As the binder, for example, metal salt of carboxymethyl cellulose and an organic binder such as stearate, or an inorganic binder such as synthetic hydrotalcite and Japanese acid clay can suitably be made use of. As the slag formation agent, silicon nitride, silica, Japanese acid clay, or the like can suitably be made use of. As the combustion modifier, a metal oxide, ferrosilicon, activated carbon, graphite, or the like can suitably be made use of. Single-base powder, double-base powder, or triple-base powder mainly composed of nitrocellulose may be employed.

A shape of a molding of the gas generating agent includes various shapes such as a particulate shape including a granule, a pellet, and a column, and a disc shape. Among columnar moldings, a molding with holes having through holes in the molding (such as a cylindrical shape with a single hole or a cylindrical shape with multiple holes) is also made use of. A size of a molding or an amount thereof for filling is preferably selected as appropriate, in consideration of a linear burning velocity, a pressure exponent, or the like of the gas generating agent in addition to a shape of the gas generating agent.

Referring to FIG. 2, sensor unit 5 detects a distance between aerial vehicle 30 and an external object (an obstacle or a point of landing) and outputs a distance detection signal representing detected distance information to controller 6. Alternatively, sensor unit 5 may detect an altitude of aerial vehicle 30 and outputs an altitude detection signal representing detected altitude information to controller 6. Sensor unit 5 preferably includes at least one of an acceleration sensor, a gyro sensor, a barometric pressure sensor, a global navigation satellite system (GNSS) apparatus, a laser sensor, an ultrasonic sensor, an infrared sensor, millimeter-wave radar, sub millimeter-wave radar, a speed sensor, and a wind direction sensor.

Controller 6 controls the pair of left and right manipulation mechanisms 10 by transmitting an activation signal as necessary, and for example, outputs a signal to activate or deactivate servo motor 12 in each of the pair of left and right manipulation mechanisms 10 or outputs a start signal to gas generator 21 in each of the pair of left and right brake cord wind-up apparatuses 20. Controller 6 receives a distance detection signal in real time from sensor unit 5 and determines whether or not to activate the pair of left and right brake cord wind-up apparatuses 20 in accordance with the received distance detection signal.

Figure 5:
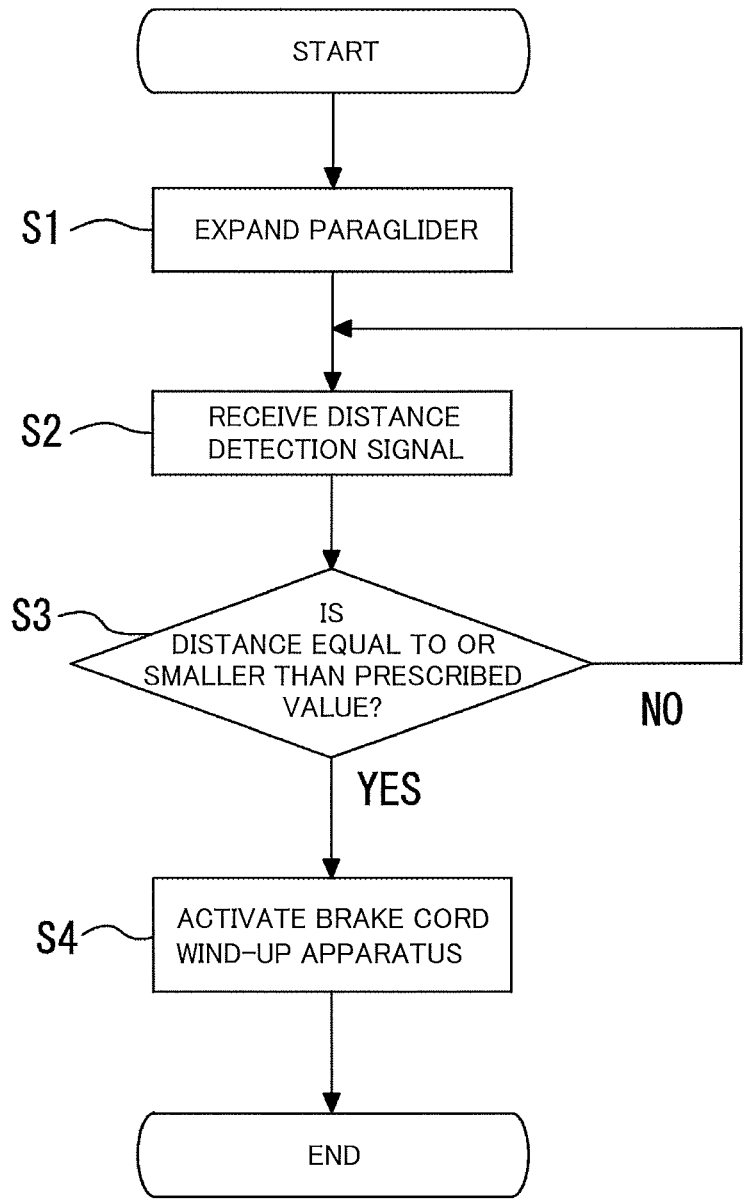
FIG. 5 is a flowchart showing a flow of control in the event of emergency of the aerial vehicle according to the embodiment.

FIG. 5 is a flowchart showing a flow of control in the event of emergency of the aerial vehicle according to the present embodiment. Processing for controlling aerial vehicle 30 when aerial vehicle 30 falls into an emergency during flight (that is, in the event of emergency) will now be described with reference to FIG. 5.

Initially, when aerial vehicle 30 falls into an emergency during flight, the control mechanism of aerial vehicle 30 transmits an abnormality signal to the ejector (not shown) of paraglider apparatus 100. The ejector of paraglider apparatus 100 that has received this abnormality signal ejects paraglider 1 from cylindrical portion 40 of aerial vehicle 30 so that the paraglider is expanded to be in the state shown in FIG. 1 (step S1).

In succession, aerial vehicle 30 prepares for landing by gradually reducing the altitude. After paraglider 1 is expanded, controller 6 receives a distance detection signal from sensor unit 5 (step S2), and determines whether or not a distance to an external object (an obstacle or a point of landing) is equal to or smaller than a prescribed value based on the distance detection signal (step S3).

When controller 6 determines that the distance to the external object is equal to or smaller than the prescribed value (step S3: YES), controller 6 transmits an activation signal to simultaneously activate the pair of left and right brake cord wind-up apparatuses 20 (step S4). The pair of left and right brake cords 4 is thus wound up.

When controller 6 determines that the distance to the external object is larger than the prescribed value (step S3: NO), the process returns to step S2. The controller continues to receive a distance detection signal from sensor unit 5 and the process proceeds to step S3. During a period until controller 6 determines that the distance to the external object is equal to or smaller than the prescribed value, controller 6 controls each of the pair of left and right manipulation mechanisms 10 to perform manipulation to wind up and unwind brake cord 4 with servo motor 12.

In aerial vehicle 30 constructed as set forth above, paraglider 1 is expanded in the event of emergency during flight and control below is carried out while a speed of falling is lowered. Specifically, controller 6 turns on or off servo motor 12 in each of the pair of left and right manipulation mechanisms 10 to thereby adjust an amount of wind-up of the pair of left and right brake cords 4 and control a direction of flight of aerial vehicle 30. Furthermore, for example, when the altitude is reduced to a prescribed value immediately before landing or when the distance to an obstacle other than the point of landing is close to a prescribed distance, controller 6 controls power supply from battery 7 to be supplied to gas generators 21 in left and right brake cord wind-up apparatuses 20 to thereby activate gas generators 21.

In gas generator 21, a large amount of gas is instantaneously generated with burning of the gas generating agent, the cup body of gas generator 21 is broken by a gas pressure, and gas at a high pressure is supplied into space 27 in cylindrical member 26. Movable member 24 is thus instantaneously moved in a direction shown with a hollow arrow in FIG. 4(A) and movable teeth 24a of movable member 24 are meshed with rotary teeth 23a of rotary member 23 to rotate rotary member 23, so that wind-up shaft 22 and reel shaft 13 are rotated. As shown in FIG. 4(B), movable member 24 is finally moved to a limit position and thereafter this state is maintained.

As a result of such operations of the pair of left and right brake cord wind-up apparatuses 20, the pair of left and right brake cords 4 is instantaneously wound up to the limit around reels 14 of the pair of left and right manipulation mechanisms 10. Therefore, aerial vehicle 30 can sufficiently reduce a speed of descent, for example, by instantaneous pulling of the pair of left and right brake cords 4 to the limit immediately before landing, so that the aerial vehicle can make a soft landing with the state that the pair of left and right brake cords 4 is wound up to the limit being maintained. Alternatively, aerial vehicle 30 can mitigate impact at the time of collision with an external obstacle by performing a similar operation immediately before collision with the external obstacle. Since gas generator 21 is employed as the drive source for brake cord wind-up apparatus 20, an effect above can be obtained without significant increase in total weight of aerial vehicle 30.

Regarding a degree of lowering in speed of falling of aerial vehicle 30 by the pair of left and right brake cord wind-up apparatuses 20, for example, when a deceleration of aerial vehicle 30 at the time of start of pulling of brake cord 4 is defined as 1 [G] and a time until gas generator 21 is activated to finish pulling of brake cord 4 is defined as 0.1 [s] with a total weight of aerial vehicle 30 being 1000 [kg], lowering in speed, for example, at 1.3 [m/s] or lower is preferred.

An optimal value of a distance (a threshold value) between aerial vehicle 30 described above and an external object at which lowering in speed of falling of aerial vehicle 30 by the pair of left and right brake cord wind-up apparatuses 20 should be started is different depending on a type of a sensor included in sensor unit 5. For example, when an ultrasonic sensor is employed, the optimal value can be set to a prescribed value not longer than 6 [m], and when another type of sensor is employed, the optimal value can be set to a prescribed value preferably not longer than 20 [m].

Figure 6:
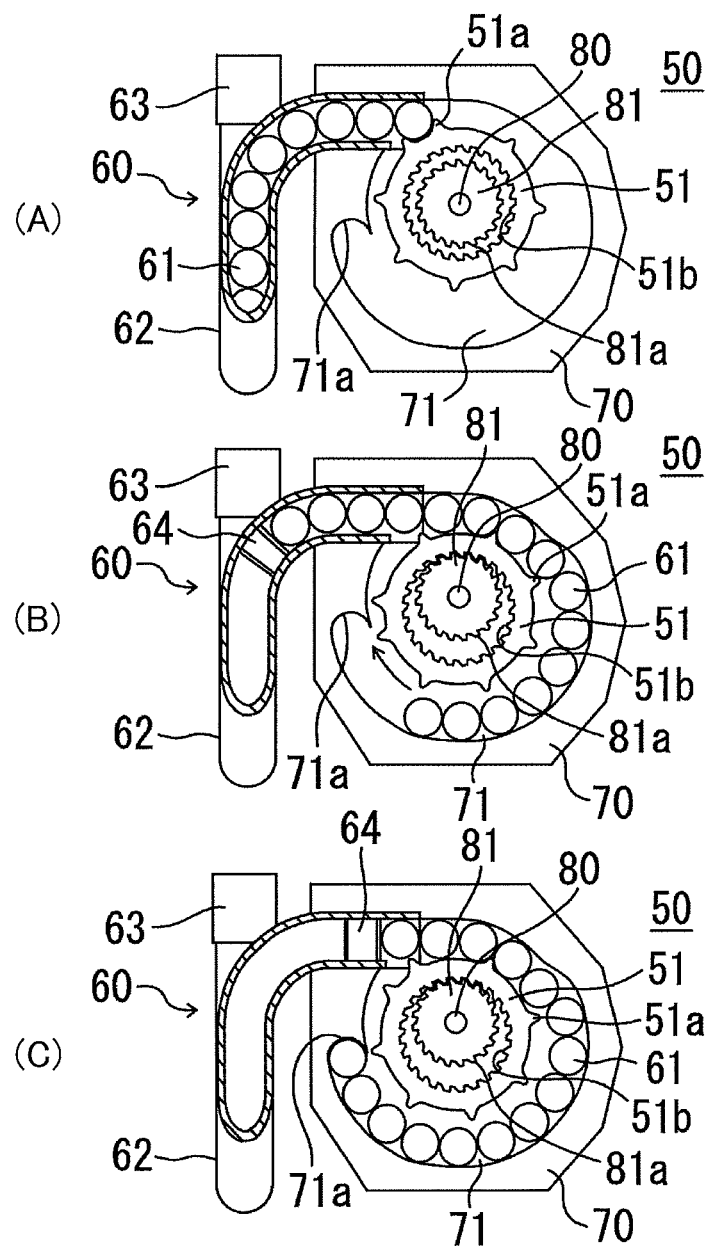
FIG. 6 is a schematic cross-sectional view of a wind-up apparatus of the aerial vehicle according to a modification, with (A) being a diagram showing an initial state of the wind-up apparatus, (B) being a diagram showing a state during an operation of the wind-up apparatus, and (C) being a diagram showing a state after the operation of the wind-up apparatus.

FIG. 6 is a schematic cross-sectional view of a wind-up apparatus of the aerial vehicle according to a modification, with (A) being a diagram showing an initial state of the wind-up apparatus, (B) being a diagram showing a state during an operation of the wind-up apparatus, and (C) being a diagram showing a state after the operation of the wind-up apparatus. Though an example in which brake cord wind-up apparatus 20 constructed as shown in FIG. 4 is employed as the wind-up apparatus is illustrated in the embodiment described above, a brake cord wind-up apparatus 50 constructed as shown in FIG. 6 may be employed instead. Brake cord wind-up apparatus 50 will be described below.

As shown in FIG. 6, brake cord wind-up apparatus 50 includes a ring gear 51 as a ring-shaped member and a motive power transmitter 60 (motive power transmission means) that transmits motive power to ring gear 51 in the event of emergency.

Motive power transmitter 60 includes a plurality of spherical members 61 as motive power transmission elements that can be engaged with a plurality of outer teeth 51a as a plurality of third teeth provided in ring gear 51, a pipe-shaped member 62 that accommodates the plurality of spherical members 61, a gas generator 63 (similar to gas generator 21) as a drive source arranged at an end of pipe-shaped member 62, a piston 64 that presses the plurality of spherical members 61 upon receiving gas generated by gas generator 63, and a housing 70 in which a passage 71 for the plurality of spherical members 61 is defined.

Housing 70 is provided in the side portion on above-described the other end side of support base 11 (see FIG. 3). Pipe-shaped member 62 is curved so as not to be in contact with support base 11 and brake cord 4 (see FIG. 3) of paraglider 1. A wind-up shaft 80 is rotatable as following reel shaft 13 (FIG. 3), and a pinion gear 81 (rotary member) is connected to wind-up shaft 80 as being coaxially arranged. A plurality of outer teeth 81a as a plurality of first teeth formed around an outer circumference of pinion gear 81 can be meshed with a plurality of inner teeth 51b as a plurality of second teeth formed around an inner circumference of ring gear 51.

As shown in FIG. 6(A), in the initial state (before operation), a clearance is provided between the plurality of outer teeth 81a of pinion gear 81 and the plurality of inner teeth 51b of ring gear 51, and wind-up shaft 80 and pinion gear 81 are rotatable without interfering with ring gear 51. In the initial state, brake cord wind-up apparatus 50 is not operating, reel shaft 13 is rotatable, and brake cord 4 can be fed.

A recess that can be engaged only with a first spherical member 61 located foremost and a plurality of recesses each one of which can be engaged with two of second and subsequent spherical members 61 are provided among the plurality of outer teeth 51a of ring gear 51.

Pipe-shaped member 62 is filled with the plurality of spherical members 61, and in the initial state, the plurality of spherical members are locked by the plurality of outer teeth 51a so as not to move. Passage 71 is provided in housing 70 such that the plurality of spherical members 61 are movable along a sidewall and the outer circumference of ring gear 51.

Piston 64 is arranged on a rearmost side of the plurality of spherical members 61 accommodated in pipe-shaped member 62 (see FIG. 6(B)). Gas generator 63 is arranged at a terminal portion of pipe-shaped member 62 as described above.

In the aerial vehicle provided with brake cord wind-up apparatus 50 constructed as such, gas generator 63 is activated immediately before landing or immediately before collision with an external object so that high-pressure gas is injected from gas generator 63 into pipe-shaped member 62. As a result of injection of high-pressure gas, piston 64 slides within pipe-shaped member 62 while it is in intimate contact with an inner surface of pipe-shaped member 62 to prevent leakage of high-pressure gas. As a result of slide of piston 64, the plurality of aligned spherical members 61 are pressed and moved within pipe-shaped member 62.

Referring to FIG. 6(A), first spherical member 61 pushed out of pipe-shaped member 62 presses ring gear 51 while it is engaged with outer teeth 51a of ring gear 51. Ring gear 51 is thus moved toward pinion gear 81. Consequently, the plurality of inner teeth 51b of ring gear 51 and the plurality of outer teeth 81a of pinion gear 81 are meshed with one another at prescribed positions and pinion gear 81 is rotated by rotation of ring gear 51. Wind-up shaft 80 and reel shaft 13 thus start rotation in the direction of wind-up.

In succession, as shown in FIG. 6(B), the plurality of spherical members 61 are successively ejected out of pipe-shaped member 62 by high-pressure gas supplied by gas generator 63. Each of the plurality of ejected spherical members 61 is engaged with a corresponding one of the plurality of outer teeth 51a of ring gear 51 and rotates ring gear 51, and thereafter leaves ring gear 51 and moves along passage 71.

As shown in FIG. 6(C), at the time point when the plurality of spherical members 61 push one another and first spherical member 61 reaches a terminal portion 71a of passage 71, the plurality of spherical members 61 stop moving. Thereafter, this state is maintained.

Brake cord wind-up apparatus 50 constructed as such can also achieve an effect the same as that of brake cord wind-up apparatus 20 according to the embodiment described above.

The plurality of spherical members described above merely represent one example of the motive power transmission element, and any feature is applicable as the motive power transmission element so long as it can transmit motive power to the ring gear. For example, a motive power transmission element may be made up of an elongated member composed of a flexible resin or rubber including a portion in conformity with a shape and a position of each outer tooth of the ring gear. According to such a construction as well, the ring gear can be rotated and moved toward the pinion gear at the time when the brake cord wind-up apparatus is operated.

Though an example in which two brake cord wind-up apparatuses are provided in correspondence with the pair of left and right brake cords is illustrated and described in the embodiment and the modification above, the pair of left and right brake cords may be wound up by a single brake cord wind-up apparatus.

Characteristic features in the disclosure in the embodiment and the modification thereof described above are summarized as below by paragraphs.

(1) An apparatus for lowering a speed of a paraglider in the present invention is an apparatus for lowering a speed of a paraglider that is provided in an aerial vehicle and capable of adjusting a speed of falling of the aerial vehicle, and it includes a paraglider including a canopy that forms a wing shape as a whole by receiving air, a brake cord provided as having one end branched in a rear edge of the canopy or a brake cord having one end directly connected to the rear edge of the canopy, a brake cord wind-up apparatus that includes a gas generator serving as a drive source and winds up the other end of the brake cord, a sensor unit that detects a distance between the aerial vehicle and an obstacle, a speed of the aerial vehicle, and a wind direction around the aerial vehicle, and a controller that controls activation of the gas generator based on information detected by the sensor unit. When the distance detected by the sensor unit is equal to or shorter than a prescribed distance, the controller activates the gas generator and controls the brake cord wind-up apparatus to wind up the brake cord to thereby further lower a speed of descent of the paraglider. One brake cord wind-up apparatus or two or more brake cord wind-up apparatuses may be provided. The number of brake cord wind-up apparatuses is selected as appropriate in view of control accuracy, light weight, and cost efficiency. The brake cord may be branched into a brake cord for steering control and a brake cord for the wind-up apparatus for immediate lowering in speed, for example, immediately before landing or immediately before contact with an obstacle. A plurality of brake cords may be provided separately for each purpose of use.

(2) In the apparatus for lowering a speed of a paraglider in (1), the brake cord wind-up apparatus preferably includes a wind-up shaft around which the brake cord can be wound by being rotated in a prescribed direction, a rotary member that is provided with a plurality of rotary teeth and can rotate the wind-up shaft in the prescribed direction by being rotated in the prescribed direction, and a movable member that is provided with a plurality of movable teeth and moved toward the rotary member by a pressure of gas generated by the gas generator so that the movable teeth are meshed with the rotary teeth to rotate the rotary member in the prescribed direction.

(3) From a different point of view, in the apparatus for lowering a speed of a paraglider in (1), the brake cord wind-up apparatus may include a wind-up shaft around which the brake cord can be wound by being rotated in a prescribed direction, a rotary member that is provided with a plurality of rotary teeth and can rotate the wind-up shaft in the prescribed direction by being rotated in the prescribed direction, an annular ring gear having outer teeth provided on an outer circumferential side and inner teeth provided on an inner circumferential side as being engaged with the rotary teeth of the rotary member, and motive power transmission means that transmits motive power to the ring gear. The motive power transmission means includes a motive power transmission member that can be engaged with the outer teeth of the ring gear, a pipe that accommodates the motive power transmission member, a piston that presses the motive power transmission member upon receiving gas generated by the gas generator arranged at an end of the pipe, and a housing including a passage for the motive power transmission member therein.

(4) In the apparatus for lowering a speed of a paraglider in (1) to (3), the gas generator preferably generates gas with burning of gunpowders or a propellant.

(5) In the apparatus for lowering a speed of a paraglider in (1) to (4), the sensor unit preferably includes at least one of an acceleration sensor, a gyro sensor, a barometric pressure sensor, a GNSS apparatus (a GPS apparatus), a laser sensor, an ultrasonic sensor, an infrared sensor, millimeter-wave radar, sub millimeter-wave radar, a speed sensor, and a wind direction sensor.

(6) An aerial vehicle in the present invention includes an airframe, the apparatus for lowering a speed of a paraglider in (1) to (5) provided in the airframe, and one propulsive mechanism or a plurality of propulsive mechanisms that is/are coupled to the airframe and propel(s) the airframe.

Among the paragliders described above, a Rogallo paraglider is also available as a paraglider similar in feature. In order to maintain a wing shape by using ram air, a paraglider with an air intake is in the mainstream, however, there is a paraglider without an air intake. In order to fly in a stable manner, a paraglider with an air intake is more preferable. A paraglider capable of flying by forcibly obtaining propelling force by including a propulsive apparatus such as a propeller may be applicable.

According to the apparatus for lowering a speed of a paraglider in the present invention, when a flying aerial vehicle falls into an emergency, a brake cord wind-up apparatus is activated to instantaneously wind up a brake cord so as to minimize a speed of falling. Thus, the aerial vehicle to which the apparatus for lowering a speed of a paraglider in the present invention is applied can sufficiently be low in speed of descent, for example, immediately before landing and can make a soft landing. Since the speed of falling can further be lowered immediately before collision with an obstacle, impact of collision can further be mitigated. Since a gas generator is employed as a drive source for the brake cord wind-up apparatus, the effect above can be achieved with a relatively light weight. According to the apparatus for lowering a speed of a paraglider in the present invention, each effect above can sufficiently be achieved even when it is applied to a large industrial aerial vehicle. The aerial vehicle to which the apparatus for lowering a speed of a paraglider in the present invention is applied can enjoy the effect of the apparatus for lowering a speed of a paraglider in the present invention.

The embodiment and the modification thereof disclosed herein are illustrative and non-restrictive in every respect. The technical scope of the present invention is delimited by the terms of the claims and includes any modifications within the scope and meaning equivalent to the terms of the claims.

REFERENCE SIGNS LIST 1 paraglider; 2 canopy; 3 suspension line; 4 brake cord; 5 sensor unit; 6 controller; 7 battery; 10 manipulation mechanism; 11 support base; 12 servo motor; 13 reel shaft; 14 reel; 20 brake cord wind-up apparatus; 21 gas generator; 22 wind-up shaft; 23 rotary member; 23a rotary tooth; 24 movable member; 24a movable tooth; 25 case; 26 cylindrical member; 27 space; 30 aerial vehicle; 31 airframe; 33 leg; 40 cylindrical portion; 50 brake cord wind-up apparatus; 51 ring gear; 51a outer tooth; 51b inner tooth; 60 motive power transmitter; 61 spherical member; 62 pipe-shaped member; 63 gas generator; 64 piston; 70 housing; 71 passage; 71a terminal portion; 80 wind-up shaft; 81 pinion gear; 81a outer tooth; 100 paraglider apparatus

The invention claimed is:

1. An aerial vehicle comprising:
an airframe;
a propulsive mechanism provided in the airframe, the propulsive mechanism propelling the airframe;
a canopy that forms a wing shape by receiving wind, the canopy being capable of adjusting a speed of falling during falling;
a brake cord having one end connected to the canopy;
a wind-up apparatus provided in the airframe, the wind-up apparatus being capable of winding up the other end of the brake cord;
a sensor unit that detects a distance to an external object; and
a controller that controls an operation of the wind-up apparatus based on a result of detection by the sensor unit,
the wind-up apparatus including a gas generator as a drive source, wherein
when the distance detected by the sensor unit is equal to or smaller than a prescribed value, the controller has the wind-up apparatus operate to wind up the other end of the brake cord by activating the gas generator.

2. The aerial vehicle according to claim 1, wherein
the wind-up apparatus includes
a wind-up shaft around which the brake cord is wound up by being rotated in a direction of wind-up,
a rotary member capable of rotating the wind-up shaft in the direction of wind-up by being rotated in a prescribed direction, and
a movable member movable toward the rotary member,
the rotary member is provided with a plurality of first teeth,
the movable member is provided with a plurality of second teeth that can be meshed with the plurality of first teeth, and
as the movable member moves toward the rotary member by receiving a pressure of gas generated by the gas generator, the plurality of second teeth are meshed with the plurality of first teeth and the rotary member is rotated in the prescribed direction.

3. The aerial vehicle according to claim 1, wherein
the wind-up apparatus includes
a wind-up shaft around which the brake cord is wound up by being rotated in a direction of wind-up,
a rotary member capable of rotating the wind-up shaft in the direction of wind-up by being rotated in a prescribed direction,
a ring-shaped member movable toward the rotary member, the ring-shaped member being capable of rotating the rotary member in the prescribed direction by being rotated in the prescribed direction, and
a motive power transmitter that transmits motive power to the ring-shaped member,
the motive power transmitter includes a pipe-shaped member, a motive power transmission element movably accommodated in the pipe-shaped member, and a piston capable of pressing the motive power transmission element,
the rotary member is provided with a plurality of first teeth,
the ring-shaped member is provided with a plurality of second teeth that can be meshed with the plurality of first teeth and a plurality of third teeth that can be engaged with the motive power transmission element, and
with movement of the ring-shaped member toward the rotary member by receiving motive power transmitted by the motive power transmission element moved by being pressed by the piston that receives a pressure of gas generated by the gas generator, the motive power transmission element is engaged with the plurality of third teeth and the plurality of second teeth are meshed with the plurality of first teeth, and then the rotary member is rotated in the prescribed direction.

4. The aerial vehicle according to claim 1, wherein
the gas generator generates gas with burning of gunpowders or a propellant.

5. The aerial vehicle according to claim 1, comprising a manipulation mechanism provided in the airframe, the brake cord being manipulated with the manipulation mechanism, wherein
the manipulation mechanism can wind up and unwind the other end of the brake cord and includes a driver as a drive source,
the wind-up apparatus is contained in the manipulation mechanism,
the controller controls an operation of the manipulation mechanism based on a result of detection by the sensor unit, and
when the distance detected by the sensor unit is larger than the prescribed value, the controller controls the operation of the manipulation mechanism by controlling the driver.

6. The aerial vehicle according to claim 1, wherein
the sensor unit includes at least one of an acceleration sensor, a gyro sensor, a barometric pressure sensor, a GNSS apparatus, a laser sensor, an ultrasonic sensor, an infrared sensor, millimeter-wave radar, sub millimeter-wave radar, a speed sensor, and a wind direction sensor.

* * * * *